United States Patent
Chang et al.

(10) Patent No.: US 10,973,086 B2
(45) Date of Patent: Apr. 6, 2021

(54) RESOURCE ALLOCATION AND MODE CONFIGURATION FOR WIDE COVERAGE ENHANCEMENT

(71) Applicant: Intel IP Corporation, Santa Clara, CA (US)

(72) Inventors: Wenting Chang, Beijing (CN); Huaning Niu, San Jose, CA (US); Qiaoyang Ye, San Jose, CA (US); Salvatore Talarico, Sunnyvale, CA (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/462,188

(22) PCT Filed: Mar. 9, 2018

(86) PCT No.: PCT/US2018/021870
§ 371 (c)(1),
(2) Date: May 17, 2019

(87) PCT Pub. No.: WO2018/169806
PCT Pub. Date: Sep. 20, 2018

(65) Prior Publication Data
US 2020/0022218 A1 Jan. 16, 2020

Related U.S. Application Data

(60) Provisional application No. 62/476,591, filed on Mar. 24, 2017.

(30) Foreign Application Priority Data

Mar. 17, 2017 (WO) ................ PCT/CN2017/077121

(51) Int. Cl.
*H04W 88/00* (2009.01)
*H04W 88/06* (2009.01)
(Continued)

(52) U.S. Cl.
CPC ........... *H04W 88/06* (2013.01); *H04W 16/26* (2013.01); *H04W 72/042* (2013.01); *H04W 76/27* (2018.02)

(58) Field of Classification Search
CPC ....... H04L 5/001; H04L 5/003; H04L 5/0094; H04L 5/14; H04W 16/26; H04W 72/04;
(Continued)

(56) References Cited

U.S. PATENT DOCUMENTS 8,971,271 B2 * 3/2015 Hessler ................ H04L 1/1819
370/329
9,532,337 B2 * 12/2016 Nimbalker ............. H04L 5/001
(Continued)

FOREIGN PATENT DOCUMENTS

WO   2016/159656 A1   10/2016
WO   2016/184798 A1   11/2016

OTHER PUBLICATIONS

R1-1702153: 3GPP TSG RAN WG1 #88; Title: Overall DCI design for feMTC; Source: Intel Corporation; Agenda Item: 7.2.3.1.4; Athens, Greece; Feb. 13-17, 2017.
(Continued)

*Primary Examiner* — Frank Duong
(74) *Attorney, Agent, or Firm* — Alliance IP, LLC

(57) ABSTRACT

Technology for a user equipment (UE) operable for wideband coverage enhancement is disclosed. The UE can decode downlink control information (DCI) received in a physical downlink control channel (PDCCH). The UE can identify a transport block size (TBS) scaling factor from the DCI. The UE can identify a repetition number from the DCI,
(Continued)

wherein the repetition number configures the UE to receive or transmit one or more of data and control channel information that is repeated, in the time domain, a selected number of times based on the repetition number. The UE can encode one or more of data or control information, for transmission to a next generation node B (gNB), based on the TBS scaling factor and the repetition number.

20 Claims, 12 Drawing Sheets

(51) Int. Cl.
  *H04W 76/27*    (2018.01)
  *H04W 16/26*    (2009.01)
  *H04W 72/04*    (2009.01)

(58) Field of Classification Search
  CPC ........... H04W 72/042; H04W 72/0446; H04W 76/27; H04W 72/0406; H04W 88/06
  See application file for complete search history.

(56) References Cited

U.S. PATENT DOCUMENTS 10,587,383 B2*   3/2020   Yi ..................... H04L 5/0037
2017/0135098 A1*   5/2017   Kang ................. H04L 1/0003
2019/0372719 A1*   12/2019   Talarico ............. H04W 72/042

OTHER PUBLICATIONS

R1-1702156: 3GPP TSG RAN WG1 #88; Title: On enhanced VoLTE support in feMTC; Source: Intel Corporation: Agenda Item: 7.2.3.4; Athens, Greece; Feb. 13-17, 2017.

Status Report for RAN WG1 to TSG-RAN #74; 3GPP Draft; RP-161937; RAN1 SR RAN #74; Vienna, Austria; Dec. 6, 2016.

PCT International Preliminary Report on Patentability in PCT International Application Serial No. PCT/US2018/021870 dated Sep. 17, 2019 (7 pages).

PCT International Search Report and Written in PCT International Application Serial No. PCT/US2018/021870 dated May 30, 2018 (10 pages).

* cited by examiner

| MCS Index $I_{MCS}$ | Modulation Order $Q_m$ | TBS Index $I_{TBS}$ | Scaling factor $\alpha$ |
|---|---|---|---|
| 0 | 2 | 0 | $\alpha = 0.0625$ |
| 1 | 2 | 0 | $\alpha = 0.125$ |
| 2 | 2 | 0 | $\alpha = 0.25$ |
| 3 | 2 | 0 | $\alpha = 0.5$ |
| 4 | 2 | 1 | $\alpha = 0.125$ |
| 5 | 2 | 1 | $\alpha = 0.25$ |
| 6 | 2 | 1 | $\alpha = 0.5$ |
| 7 | 2 | 1 | $\alpha = 1$ |
| 8 | 2 | 2 | $\alpha = 0.5$ |
| 9 | 2 | 2 | $\alpha = 1$ |
| 10 | 2 | 3 | $\alpha = 1$ |
| 11 | 2 | 4 | $\alpha = 1$ |
| 12 | 2 | 5 | $\alpha = 1$ |
| 13 | 2 | 6 | $\alpha = 1$ |
| 14 | 2 | 7 | $\alpha = 1$ |
| 15 | 2 | 8 | $\alpha = 1$ |
| 16 | 2 | 9 | $\alpha = 1$ |
| 17 | 4 | 10 | $\alpha = 1$ |
| 18 | 4 | 11 | $\alpha = 1$ |
| 19 | 4 | 12 | $\alpha = 1$ |
| 20 | 4 | 13 | $\alpha = 1$ |
| 21 | 4 | 14 | $\alpha = 1$ |
| 22 | 4 | 15 | $\alpha = 1$ |
| 23 | 6 | 16 | $\alpha = 1$ |
| 24 | 6 | 17 | $\alpha = 1$ |
| 25 | 6 | 18 | $\alpha = 1$ |
| 26 | 6 | 19 | $\alpha = 1$ |
| 27 | 6 | 21 | $\alpha = 1$ |
| 28 | 6 | 23 | $\alpha = 1$ |
| 29 | Reserved | | |
| 30 | | | |
| 31 | | | |

FIG. 3

RESOURCE ALLOCATION AND MODE CONFIGURATION FOR WIDE COVERAGE ENHANCEMENT

BACKGROUND

Wireless systems typically include multiple User Equipment (UE) devices communicatively coupled to one or more Base Stations (BS). The one or more BSs may be Long Term Evolved (LTE) evolved NodeBs (eNB) or new radio (NR) NodeBs (gNB) or next generation node Bs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 3 depicts transport block size (TBS) scaling in accordance with an example;

Figure 1:
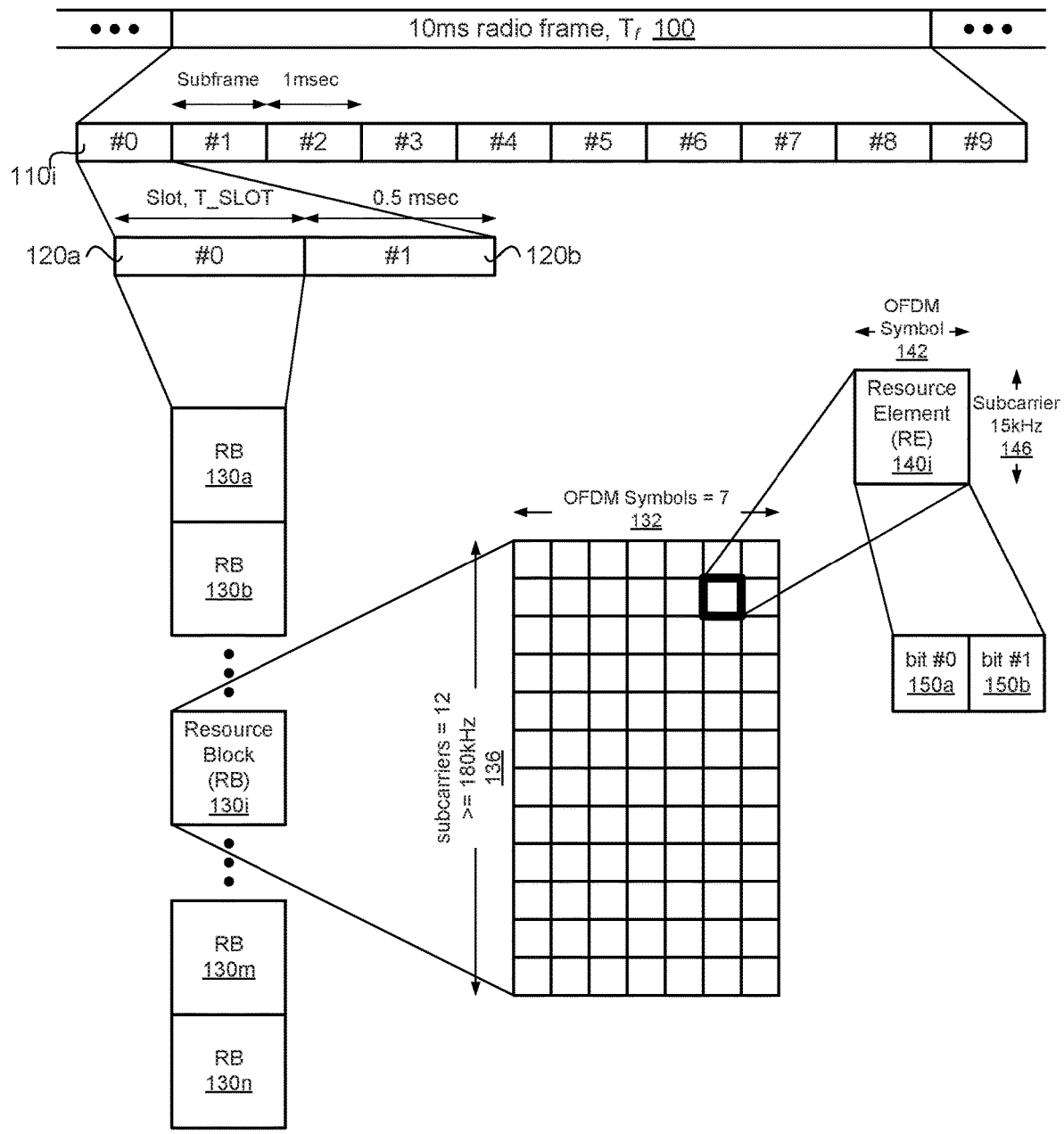
FIG. 1 illustrates a block diagram of an orthogonal frequency division multiple access (OFDMA) frame structure in accordance with an example

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Both Third-Generation Partnership Project (3GPP) Long Term Evolved (LTE) Release 13 enhanced Machine Type Communication (eMTC) and 3GPP LTE Narrowband Internet of Things (NB-IoT) can operate in the licensed spectrum. On the other hand, the scarcity of licensed spectrum in the low frequency band can result in a deficit in the data rate boost. Therefore, there is emerging interest in the operation of LTE systems in the unlicensed spectrum.

Potential LTE operation in the unlicensed spectrum includes, but is not limited to, the Carrier Aggregation based licensed-assisted access (LAA)/enhanced LAA (eLAA) systems, LTE operation in the unlicensed spectrum via dual connectivity (DC), and the standalone LTE system in the unlicensed spectrum, in which LTE-based technology can operate in the unlicensed spectrum without using an "anchor" in the licensed spectrum—called MulteFire.

Internet of Things (IoT) is envisioned as a significant technology that has huge potential and may change our daily life entirely by enabling connectivity between a multitude of devices. IoT has wide applications in various scenarios, including smart cities, smart environment, smart agriculture, and smart health systems.

3GPP has standardized two designs to support IoT services—enhanced Machine Type Communication (eMTC) and NarrowBand IoT (NB-IoT). As eMTC and NB-IoT UEs will be deployed in huge numbers, lowering the cost of these UEs is a key enabler for implementation of IoT. Also, low power consumption is desirable to extend the life time of the battery of the UEs. In addition, there is a substantial use case of devices deployed deep inside buildings which would use coverage enhancement (CE) in comparison to the defined LTE cell coverage footprint. In summary, eMTC and NB-IoT techniques are designed to ensure that the UEs have low cost, low power consumption and enhanced coverage. To extend the benefits of LTE IoT designs into unlicensed spectrum, MulteFire Release 1.1 is expected to specify the design for Unlicensed-IoT (U-IoT) based on eMTC and/or NB-IoT. The unlicensed frequency band of current interest for NB-IoT or eMTC based U-IoT is the sub-1 GHz band and the ~2.4 GHz band.

Different from eMTC and NB-IoT, which apply to narrowband operation, wideband coverage enhancement (WCE) is also agreed as one of the MulteFire Release 1.1 work items with operational bandwidth of 10 MHz and 20 MHz. The objective of WCE is to extend the MulteFire Release 1.0 coverage to meet industry IoT market demand, with the targeting operating bands at 3.5 GHz and 5 GHz.

A target user equipment (UE) can be located in locations that can cause significant signal degradation, such as the deepest corner of a building, in a basement, in a bridge, partially buried in farm land, and so forth. The signal degradation due to the location can affect the functionality. This can be true when the UE is being used for IoT applications. Enhancing or extending the coverage of a cell can not only enhance the link quality of the PDSCH but can also reduce the number of next generation node Bs (gNBs) that are deployed, which can reduce the deployment cost.

There are a few ways to enable coverage enhancement, e.g. repetition in the time or frequency domain, introducing a new transport block size (TBS) table, or power boosting. However, different schemes can have a different impact on the resource allocation. For instance, for frequency domain repetition, whether a UE is configured for localized repetition or distributed repetition can affect the resource allocation. Based on this motivation, details are provided on the resource allocation for WCE. Furthermore, details are provided on how to configure and interpret the transmission mode (i.e. whether a UE is operating in a normal mode or operating in a WCE mode). For instance, the UE may move from a position close to a node, such as a next generation node Bs (gNB), to a position that is far away from the gNB, or vice versa. In these differing circumstances, the resource allocation can be adjusted accordingly.

FIG. 1 provides an example of a 3GPP LTE Release 8 frame structure. In particular, FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes $110i$ that are each 1 ms long. Each subframe can be further subdivided into two slots $120a$ and $120b$, each with a duration, $T_{slot}$, of 0.5 ms. The first slot (#0) $120a$ can include a legacy physical downlink control channel (PDCCH) 160 and/or a physical downlink shared channel (PDSCH) 166, and the second slot (#1) $120b$ can include data transmitted using the PDSCH.

Each slot for a component carrier (CC) used by the node and the wireless device can include multiple resource blocks (RBs) $130a$, $130b$, $130i$, $130m$, and $130n$ based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first Orthogonal Frequency Division Multiplexing (OFDM) symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) $130i$ can include 12-15 kilohertz (kHz) subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) $140i$ using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits $150a$ and $150b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP LTE Release 8 frame structure provides examples of the way in which data is transmitted, or the transmission mode. The example is not intended to be limiting. Many of the Release 8 features will evolve and change in 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband) 204, mMTC (massive Machine Type Communications or massive IoT) 202 and URLLC (Ultra Reliable Low Latency Communications or Critical Communications) 206. The carrier in a 5G system can be above or below 6 GHz. In one embodiment, each network service can have a different numerology.

Different approaches can be used to enhance the link quality for UEs that are located at a cell edge and to extend the coverage area. The control channel and data channel can be enhanced through these different approaches. In one example, time domain repetition can be used. In another example, frequency domain repetition can be used. Both time and frequency resources can be configured by the gNB through downlink control information (DCI) transmitted in a physical downlink control channel (PDCCH).

In one example, a repetition number can be configured by the gNB through DCI. The repetition number can be determined by the gNB based on the maximum coupling loss that is desired. The repetition number can be located in the DCI when the UE is configured to operate in a WCE mode. If the transmitted subframe exceeds the current transmission opportunity (TxOP) the gNB can have several options. In one option, the gNB can perform one shot listen before talk (LBT) within the remaining subframes at the end of a given TxOP. For example, the final two symbols of the remaining subframes can be blanked. These two symbols can be used to perform LBT for the subsequent subframe.

Figure 2A:
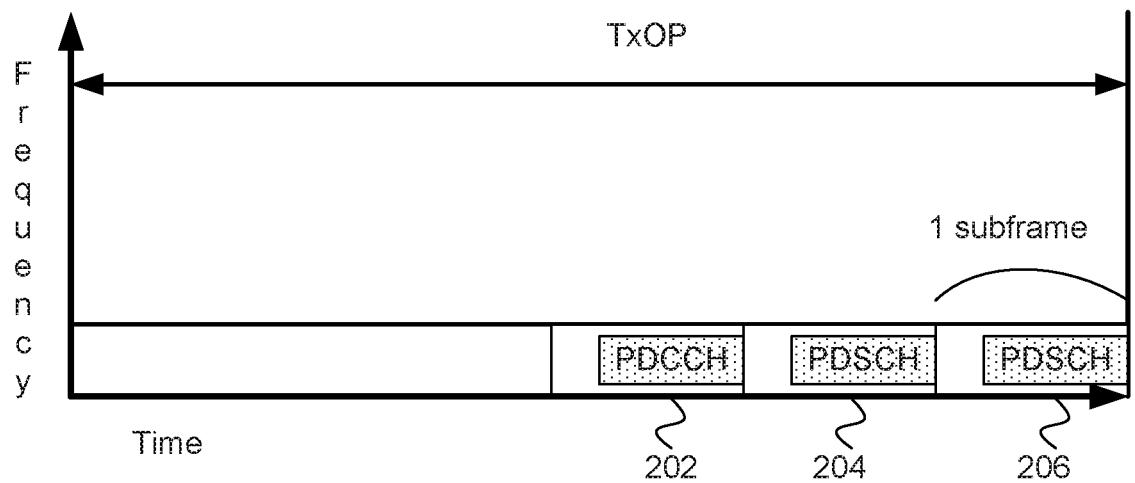
FIG. 2a illustrates repetition in the time domain in accordance with an example.
Figure 2B:
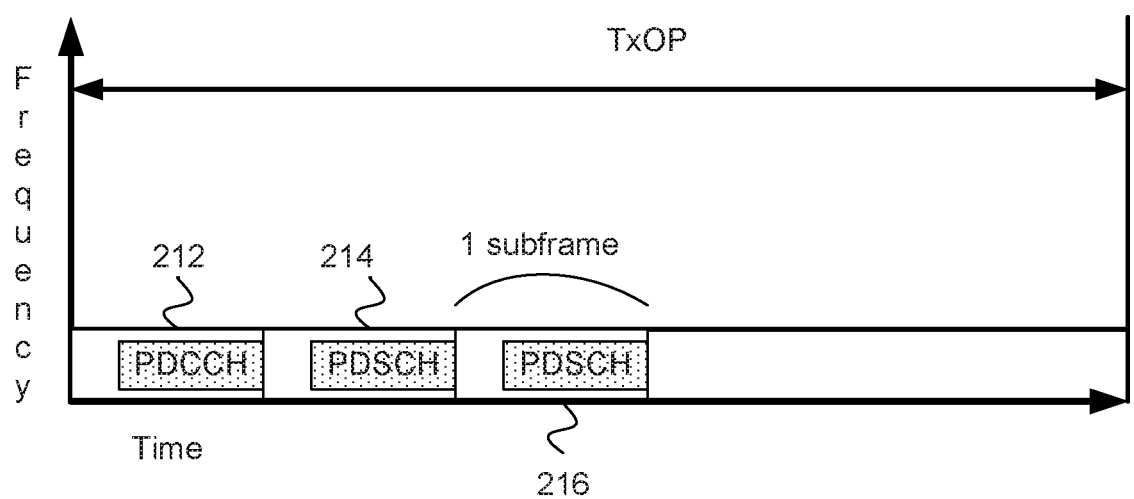
FIG. 2b illustrates repetition in the time domain in accordance with an example.

In another option, as illustrated in FIG. 2a and FIG. 2b, the gNB can perform category 4 LBT, which is based on a binary exponential back-off, at the end of a given TxOP. In this option, the same control information can be transmitted to inform the UE to perform a combination. In FIG. 2a and FIG. 2b, the same hybrid automatic repeat request (HARQ) number (i.e. HARQ process index) and new data indicator (NDI) can be configured for two DCIs to enable the UE to know that the same packet is transmitted during different TxOPs. The redundancy version (RV) of different DCIs can be either the same for symbol combination, or different in order to benefit from coding gain. The repetition for different DCIs can be different or the same based on the TxOP length and the number of repetitions.

As illustrated in FIG. 2a, the TxOP extends over several subframes. In 202, 204, and 206, the PDCCH, physical downlink shared channel (PDSCH), and another PDSCH are each present in different subframes. In this example, the HARQ number is 0, the NDI is 1, the RV is 0, and the repetition number is 2. The HARQ number indicates the HARQ process number. The NDI indicates a new transmission or a retransmission. The RV indicates the amount of redundancy.

As illustrated in FIG. 2b, the TxOP extends over several subframes. In 212, 214, and 216, the PDCCH, a PDSCH, and another PDSCH, are each present in different subframes. In this example, the HARQ number is 0, the NDI is 1, the RV is 1, and the repetition number is 2.

In FIG. 2a and FIG. 2b, the HARQ number and NDI are the same in both examples (i.e. the HARQ number is 0 in both examples and the NDI is 1 in both examples). Therefore, the UE can know that the same packet is transmitted during the different TxOPs. The redundancy version is different in each of FIG. 2a and FIG. 2b (i.e. the RV is 0 in FIG. 2a and the RV is 1 is FIG. 2b), which allows for coding gain. The repetition in both of FIG. 2a and FIG. 2b is the same (i.e. the repetition number is 2 in both examples).

In one example, the TxOP for a physical uplink shared channel (PUSCH) combination can be supported, where the gNB can utilize different DCIs with the same HARQ process index and NDI indicator.

Figure 2C:
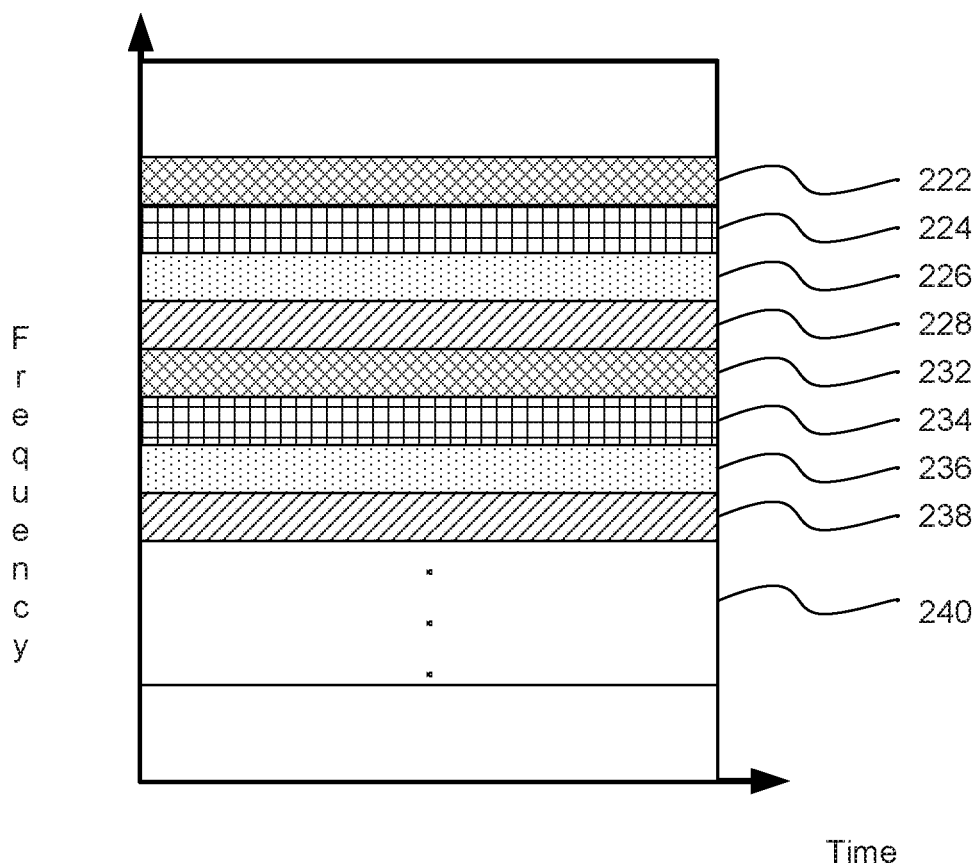
FIG. 2c illustrates resource allocation for frequency repetition in accordance with an example.
Figure 2D:
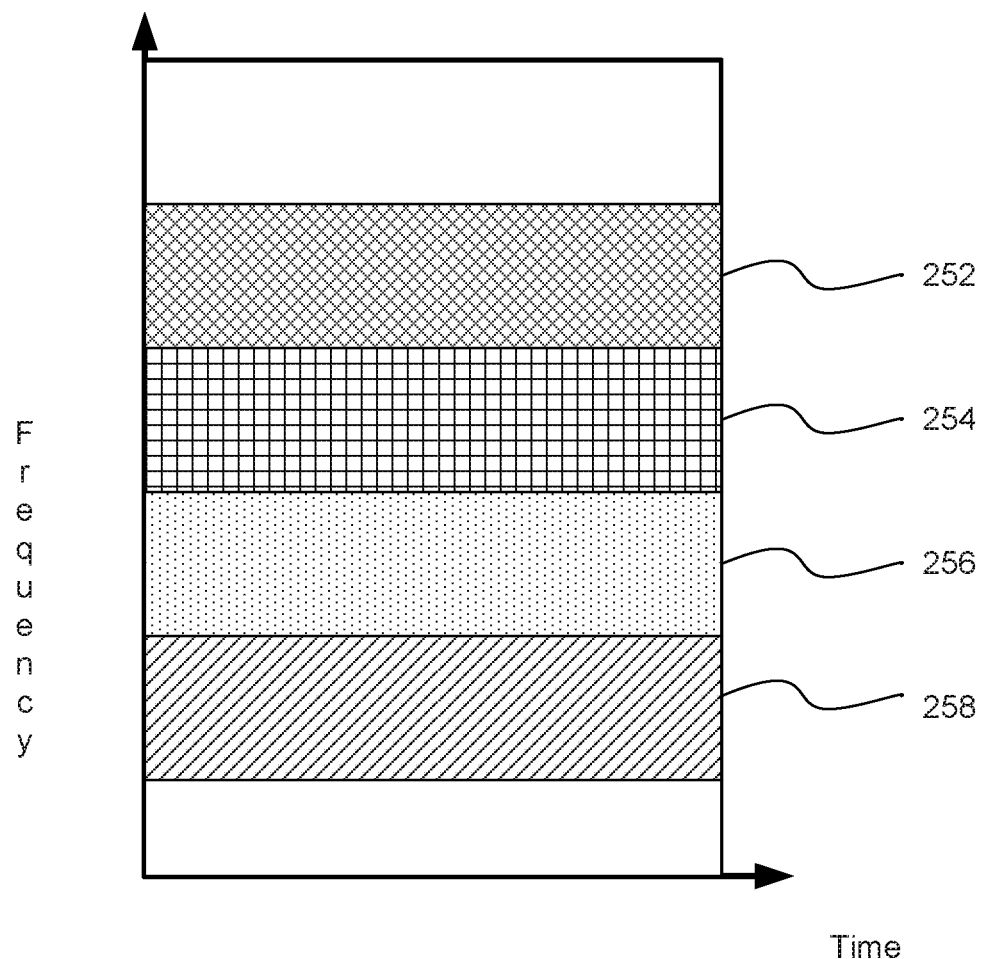
FIG. 2d illustrates resource allocation for frequency repetition in accordance with an example.

In another example, as illustrated in FIG. 2c and FIG. 2d, repetition in the frequency domain can be enabled. The repetition in the frequency domain can be either localized or distributed. In one example, the occupied resources of all repeated instances can be configured by DCI. Within the assigned frequency resources, the granularity of repetition can be either at the physical resource block (PRB) level, as in FIG. 2c, or at the instance level, as in FIG. 2d. The resource allocation can be either localized or distributed.

As illustrated in FIG. 2c, all of the occupied resources can be assigned by DCI, and can include PRBs 222, 224, 226, 228, 232, 234, 236, 238, and the remaining PRBs can be present in 240. As illustrated in FIG. 2d, all of the occupied resources can be assigned by DCI, and can include instances 252, 254, 256, and 258.

In another example, one instance can be configured and defined by DCI and the frequency offset for other instances can be configured by DCI to inform the frequency resource allocation. In one option, the interlace can be defined for downlink as the eLAA uplink system. The resource allocation of one instance in one or multiple interlaces can be configured through DCI in which the resource allocation within one or multiple interlaces can reuse the eLAA system. In this option, the frequency repetition times and the interlace offset can be configured through DCI.

In this example, 10 interlaces can be defined for downlink and the PRB indices with a range of $n_{start}$ to $n_{end}$ of the first interlace can be configured by the gNB. When the frequency repetition number is 4 and the interlace offset is 2, then the PRB indices of the first, third, fifth, and seventh interlaces can be occupied.

In another option, the resource allocation of the first instance can be configured. For example, the PRB indices with a range of $n_{start}$ to $n_{end}$ can be configured through DCI, in which the indices can be either localized or distributed. The repetition times and PRB offset can also be configured through DCI. In this option, the PRB offset is the gap between the ending of one instance and the starting of the next instance. For example, with a repetition times of 2 and PRB offset of 10, then the PRBs $\{[n_{start}\ n_{end}], [10+n_{end}\ 10+n_{end}+(n_{end}-n_{start})]\}$ are assigned. The two options used for frequency domain repetition can also be used for PUSCH configuration, with the exception of the interlace definition.

In another example, the total resource allocation and frequency time repetition can be configured by DCI. When the UE receives the resource allocation field, the UE can use the transport block size (TBS) table with the modulation coding scheme (MCS) index and the number of exact resource blocks (RBs) calculated by: the number of RBs in resource allocation divided by the frequency repetition.

In another example, all of the frequency shift (which can be either subcarrier or RB) can be the cyclic shift. In this example, the maximum cycle can be the maximum RBs or subcarriers for a given bandwidth.

In another example, a transport block size (TBS) table can be introduced for WCE UEs. A TBS scaling factor α can be introduced. The TBS scaling factor can be determined by the gNB based on the maximum coupling loss that is desired. This TBS scaling factor can be located in the DCI when the UE is configured to operate in the WCE mode. The TBS scaling factor can be used to determine a transport block size for the UE that is configured to operate in the WCE mode. In one example, the transport block size for the WCE UE can be (α*legacy TBS). One advantage of scaling the legacy TBS for a WCE UE is to lower the throughput which can enhance the coverage.

FIG. 3 depicts a table showing transport block size (TBS) scaling in accordance with an example. The columns of the table include the MCS index, the modulation order, the TBS index, and the scaling factor. The MCS index can include the spatial streams, the modulation type, and the coding rate. The modulation order can include the number of different symbols that can be transmitted. In this table, the smaller MCS index has a finer scaling factor to enable wide coverage enhancement. However, if the WCE UE moves closer to the UE, then the larger MCS index has a coarser scaling factor to support a high data rate. In addition, for larger MCS, the legacy TBS granularity can be very coarse so that the UE does not need to frequently switch between different modes. The TBS scaling factor can be either 0.0625, 0.125, 0.25, 0.5, or 1. In another example, the TBS scaling factor can be either 0.1, 0.2, 0.5, or 1.

With the TBS scaling factor being applied, the TBS can be either the minimum K in the table 5.1.3-3 in Technical Specification (TS) 36.212 Version 15.0.0, December 2017 (E-UTRA Multiplexing and Channel Coding) satisfying (greater than (α*legacy TBS)) or the maximum K in the table 5.1.3-3 in TS 36.212 Version 15.0.0, December 2017 satisfying (less than (α*legacy TBS)).

In another example, the WCE enhancement can be configured by the gNB through higher layer signaling. For example, '1' can be used to signal the TBS table for the WCE UE, and '0' can be used to signal the legacy TBS table. When the WCE is enabled, then the UE can perform PDCCH/enhanced PDCCH (ePDCCH) demodulation, and PDSCH/PUSCH in the WCE mode. The candidates for WCE PDCCH and the DCI format can be different from the normal PDCCH. In this example, the UE can perform control and data transmission and reception in the WCE mode to reduce complexity.

In another example, the WCE function can be configured by the gNB through DCI. For WCE UEs, new DCI formats and new candidates, including the aggregation level (AL) and search space, for the PDCCH/ePDCCH can be used. In one example, the repetition times can be set to 1 to indicate that normal mode is being used. In another example, a 1-bit flag can be used to indicate whether WCE mode or normal mode is being used. When operating in normal mode, the TBS can be interpreted as the legacy table. Otherwise, when the 1-bit flag indicates that the UE is operating in WCE mode, the TBS can be interpreted based on the TB table for the WCE UE.

In another example, the mode of operation can be discerned through the AL of the ePDCCH/PDCCH. If a larger AL is detected by the UE, e.g. larger than 8, then the UE can operate in the WCE mode. In this example, an AL threshold value can be configured by the gNB through higher layer signaling. For example, when the AL of the ePDCCH/PDCCH is smaller than the threshold value, then the UE can operate in the normal mode; otherwise, when the AL of the ePDCCH/PDCCH is larger than the threshold value, then the UE can operate in the WCE mode.

Figure 4:
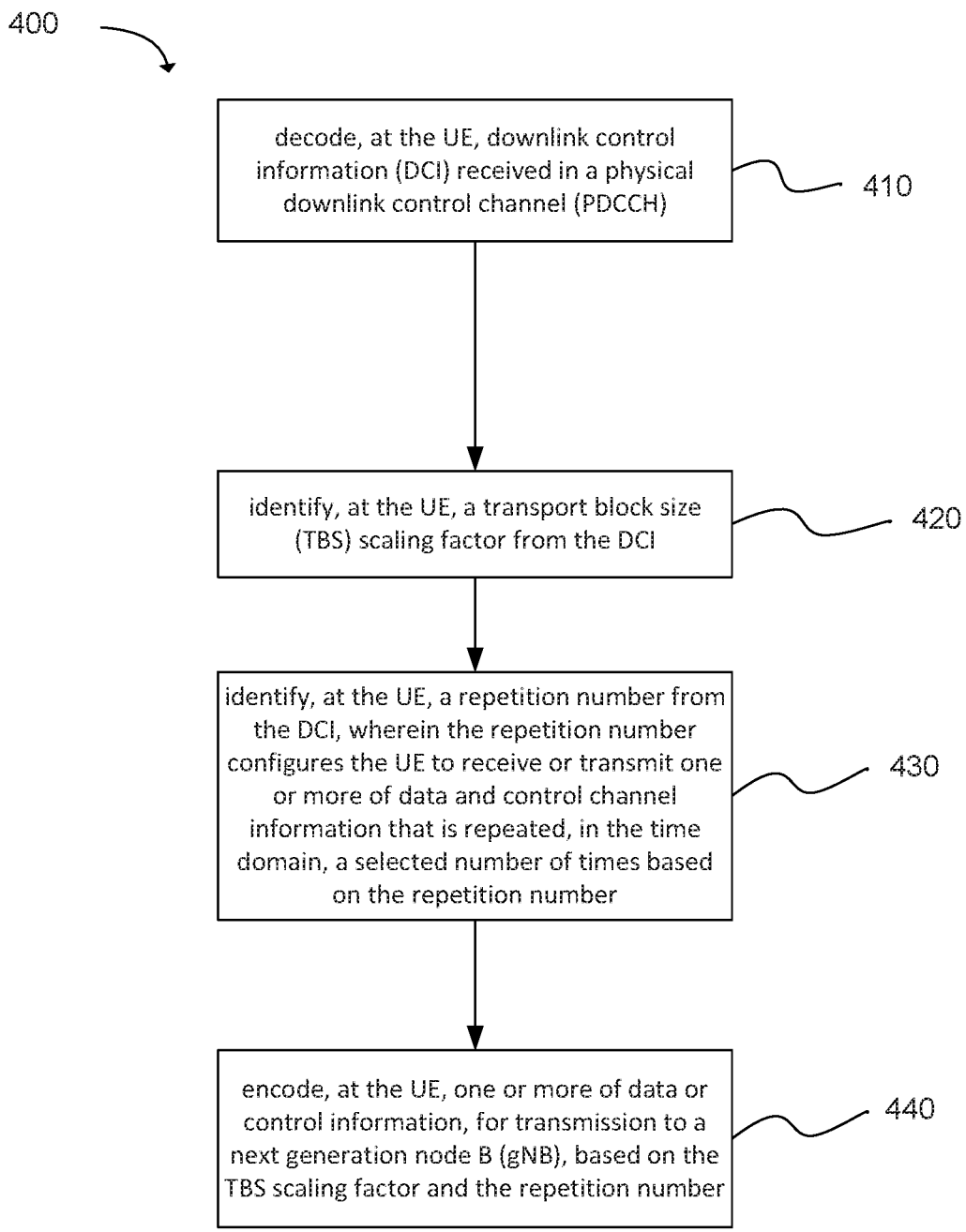
FIG. 4 depicts functionality of a user equipment (UE) operable for wideband coverage enhancement in accordance with an example.

Another example provides functionality 400 of a UE operable for wideband coverage enhancement, as shown in FIG. 4. The UE can comprise one or more processors. The one or more processors can be configured to decode, at the UE, downlink control information (DCI) received in a physical downlink control channel (PDCCH), as in block 410. The one or more processors can be configured to identify, at the UE, a transport block size (TBS) scaling factor from the DCI, as in block 420. The one or more processors can be configured to identify, at the UE, a repetition number from the DCI, wherein the repetition number configures the UE to receive or transmit one or more of data and control channel information that is repeated, in the time domain, a selected number of times based on the repetition number, as in block 430. The one or more processors can be configured to encode, at the UE, one or more of data or control information, for transmission to a next generation node B (gNB), based on the TBS scaling factor and the repetition number, as in block 440. In addition, the UE can comprise a memory interface configured to send the DCI to a memory.

Figure 5:
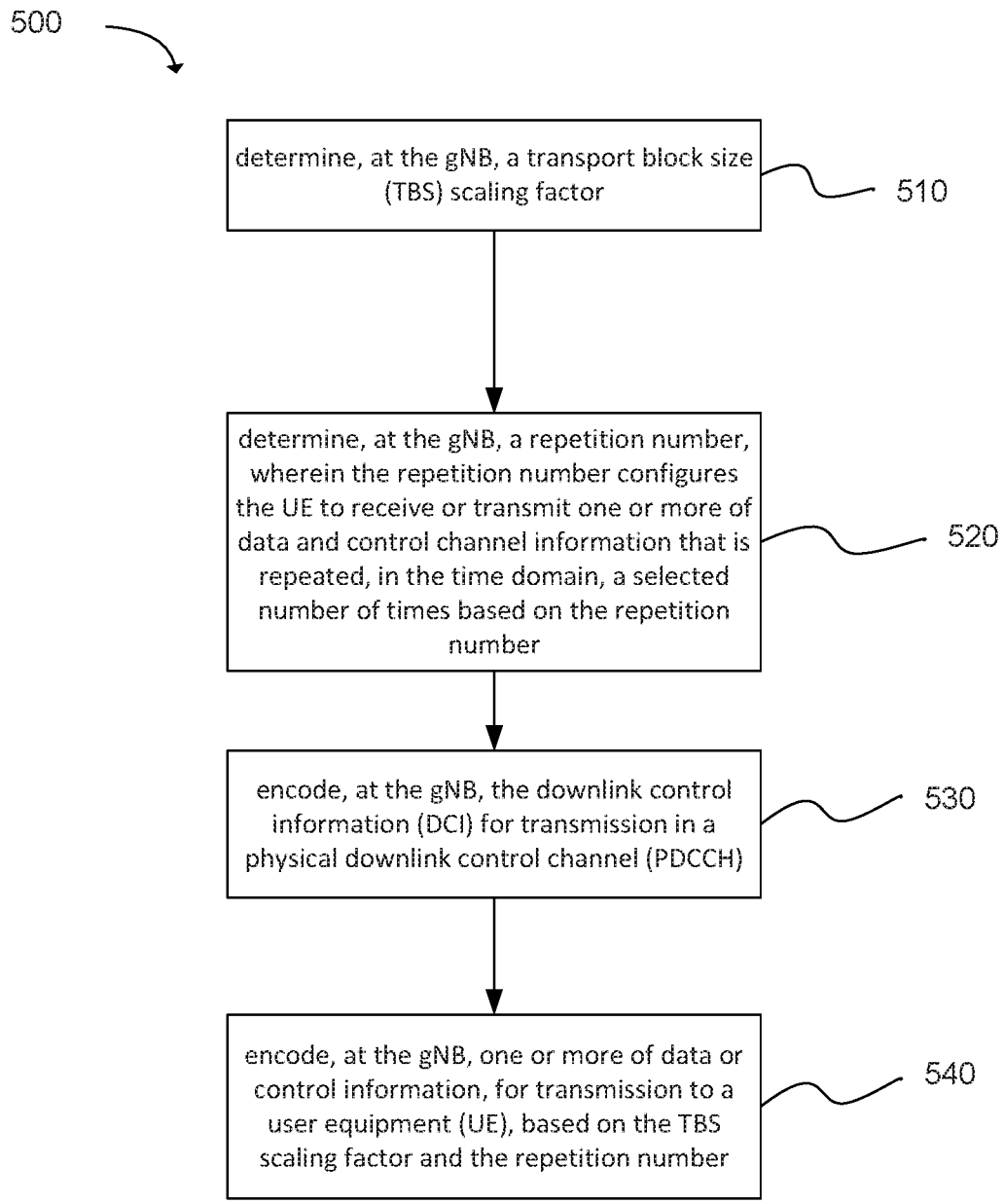
FIG. 5 depicts functionality of a next generation node B (gNB) operable for wideband coverage enhancement in accordance with an example.

Another example provides functionality 500 of a gNB operable for wideband coverage enhancement, as shown in FIG. 5. The gNB can comprise one or more processors. The one or more processors can be configured to determine, at the gNB, a transport block size (TBS) scaling factor, as in block 510. The one or more processors can be configured to determine, at the gNB, a repetition number, wherein the repetition number configures the UE to receive or transmit one or more of data and control channel information that is repeated, in the time domain, a selected number of times based on the repetition number, as in block 520. The one or more processors can be configured to encode, at the gNB, the downlink control information (DCI) for transmission in a physical downlink control channel (PDCCH), as in block 530. The one or more processors can be configured to encode, at the gNB, one or more of data or control information, for transmission to a user equipment (UE), based on the TBS scaling factor and the repetition number, as in block 540. In addition, the gNB can comprise a memory interface configured to send the DCI to a memory.

Figure 6:
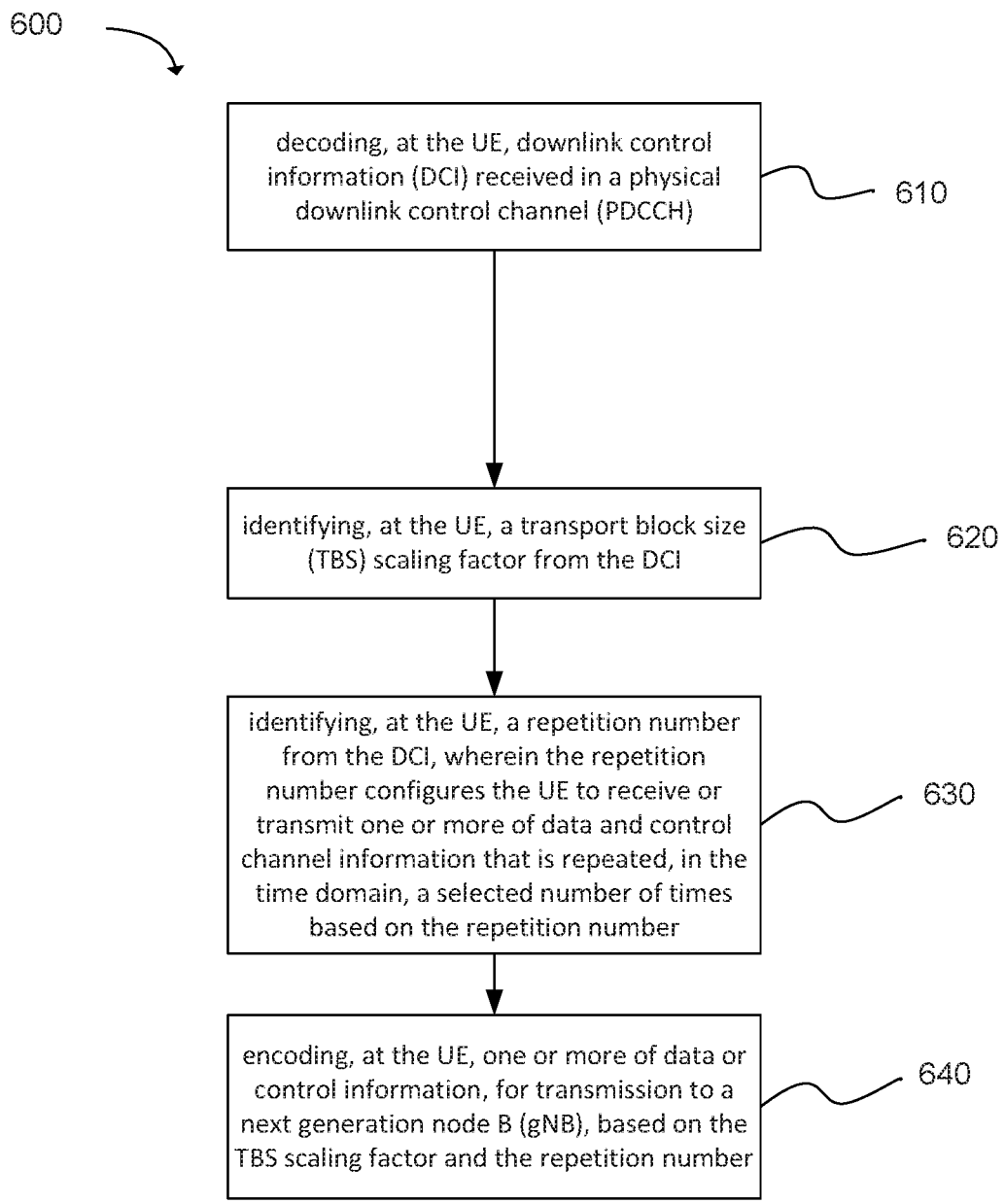
FIG. 6 depicts a flowchart of a machine readable storage medium having instructions embodied thereon for performing wideband coverage enhancement in accordance with an example.

Another example provides at least one machine readable storage medium having instructions 600 embodied thereon for performing wideband coverage enhancement, as shown in FIG. 6. The instructions can be executed on a machine, where the instructions are included on at least one computer readable medium or one non-transitory machine readable storage medium. The instructions when executed perform: decoding, at the UE, downlink control information (DCI) received in a physical downlink control channel (PDCCH), as in block 610. The instructions when executed perform: identifying, at the UE, a transport block size (TBS) scaling factor from the DCI, as in block 620. The instructions when executed perform: identifying, at the UE, a repetition number from the DCI, wherein the repetition number configures the UE to receive or transmit one or more of data and control channel information that is repeated, in the time domain, a selected number of times based on the repetition number, as in block 630. The instructions when executed perform: encoding, at the UE, one or more of data or control information, for transmission to a next generation node B (gNB), based on the TBS scaling factor and the repetition number, as in block 640.

While examples have been provided in which a gNB has been specified, they are not intended to be limiting. An evolved node B (eNodeB) can be used in place of the gNB. Accordingly, unless otherwise stated, any example herein in which a gNB has been disclosed, can similarly be disclosed with the use of an eNodeB.

Figure 7:
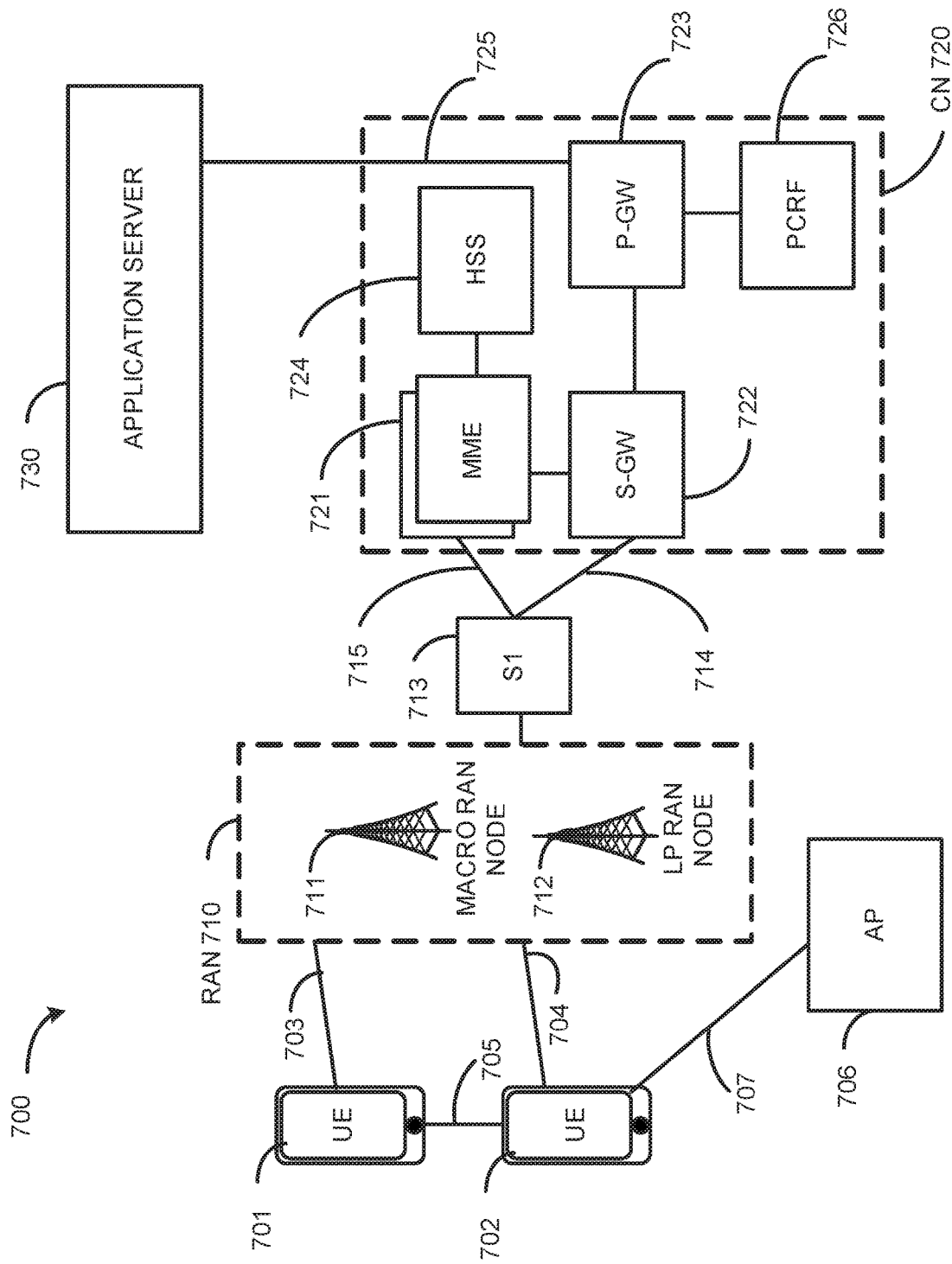
FIG. 7 illustrates an architecture of a wireless network in accordance with an example.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS)

protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.15 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
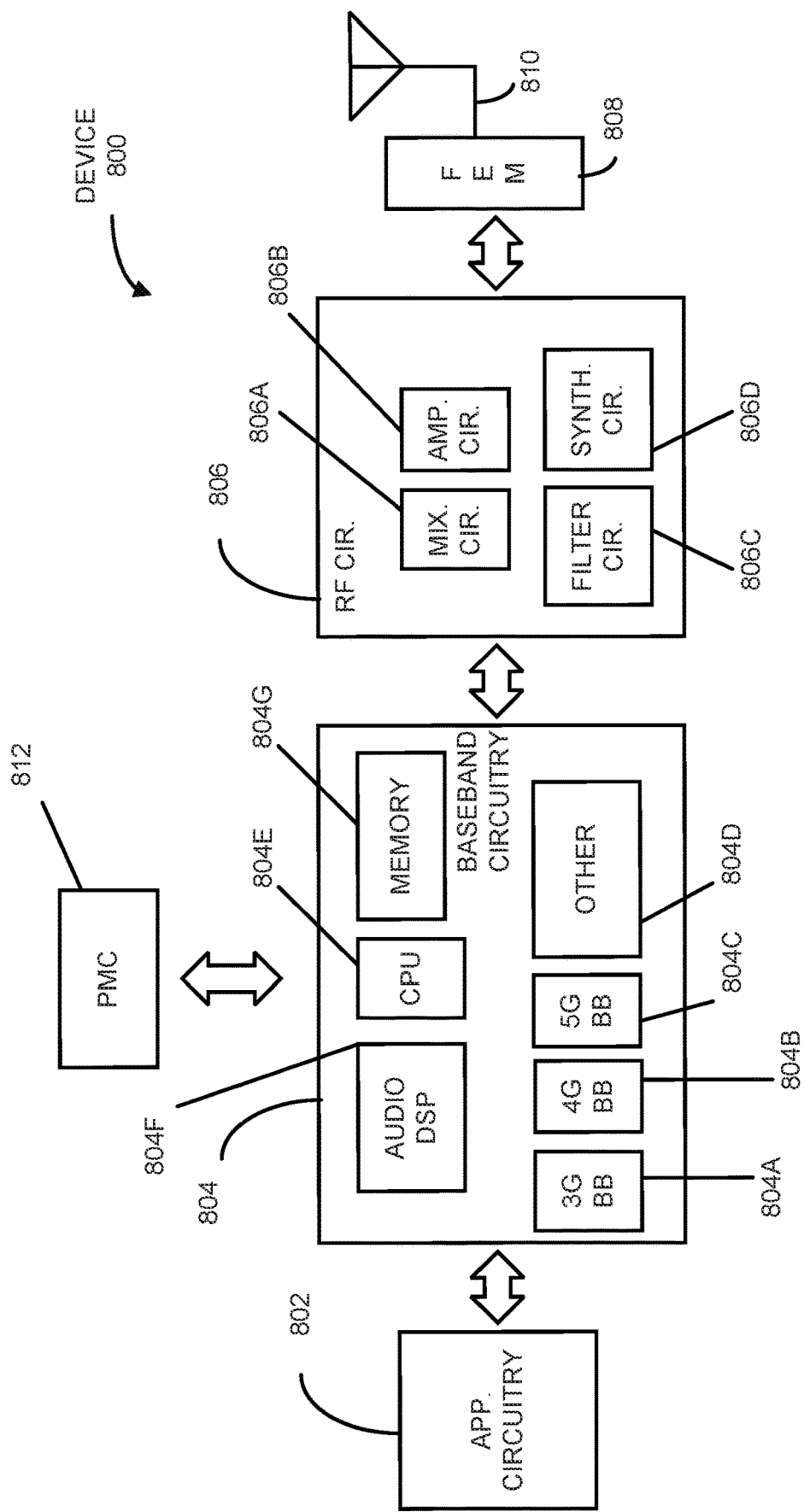
FIG. 8 illustrates a diagram of a wireless device (e.g., UE) in accordance with an example.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a third generation (3G) baseband processor 804*a*, a fourth generation (4G) baseband processor 804*b*, a fifth generation (5G) baseband processor 804*c*, or other baseband processor(s) 804*d* for other existing generations, generations in development or to be developed in the future (e.g., second generation (2G), sixth generation (6G), etc.). The baseband circuitry 804 (e.g., one or more of baseband processors 804*a-d*) may handle various radio control functions that enable communication with one or more radio networks via the RF circuitry 806. In other embodiments, some or all of the functionality of baseband processors 804*a-d* may be included in modules stored in the memory 804*g* and executed via a Central Processing Unit (CPU) 804*e*. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, or constellation mapping/demapping functionality. In some embodiments, encoding/decoding circuitry of the baseband circuitry 804 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804*f* The audio DSP(s) 804*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a necessity. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a necessity. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
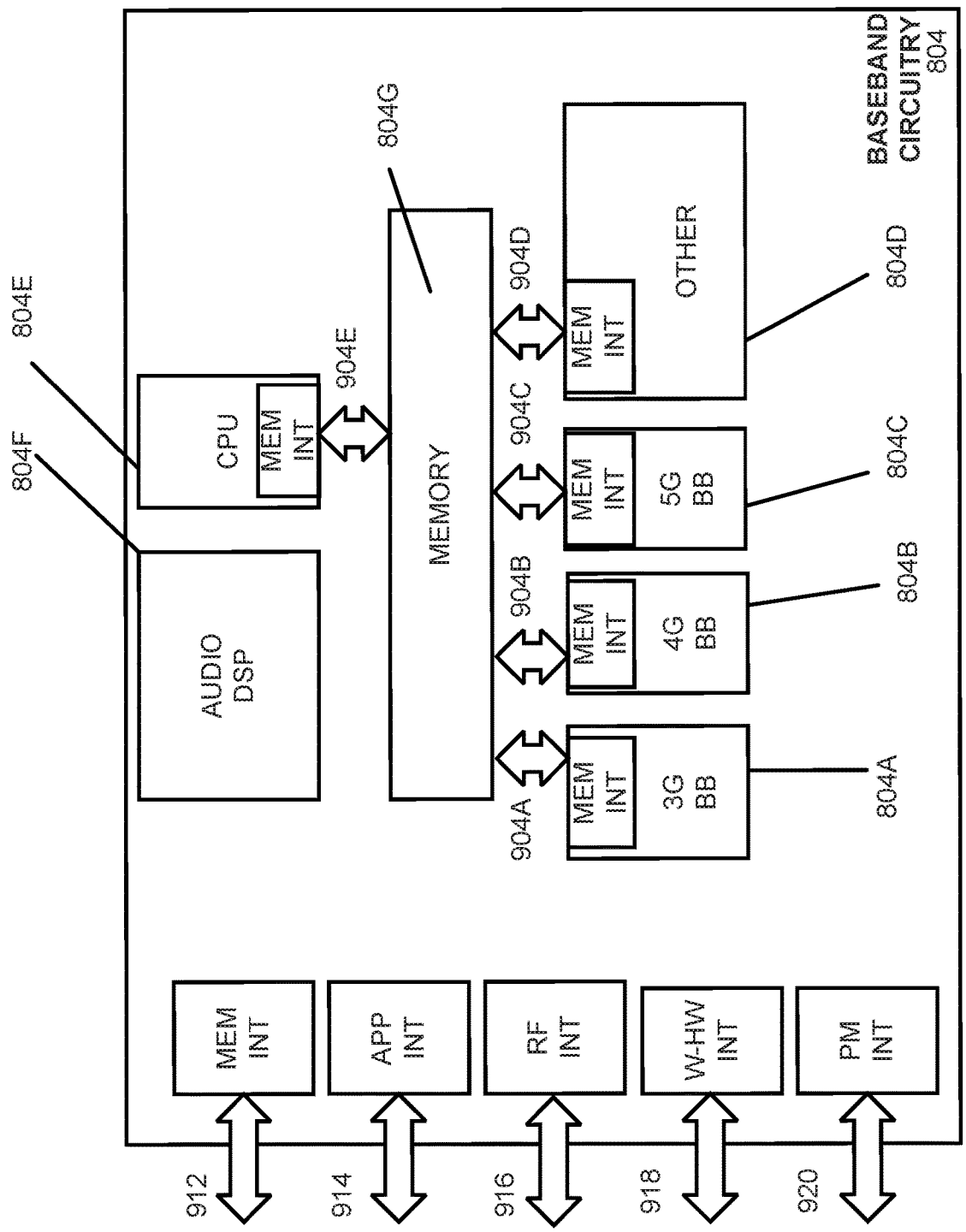
FIG. 9 illustrates interfaces of baseband circuitry in accordance with an example.

FIG. 9 illustrates example interfaces of baseband circuitry in accordance with some embodiments. As discussed above, the baseband circuitry 804 of FIG. 8 may comprise processors 804a-804e and a memory 804g utilized by said processors. Each of the processors 804a-804e may include a memory interface, 904a-904e, respectively, to send/receive data to/from the memory 804g.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

Figure 10:
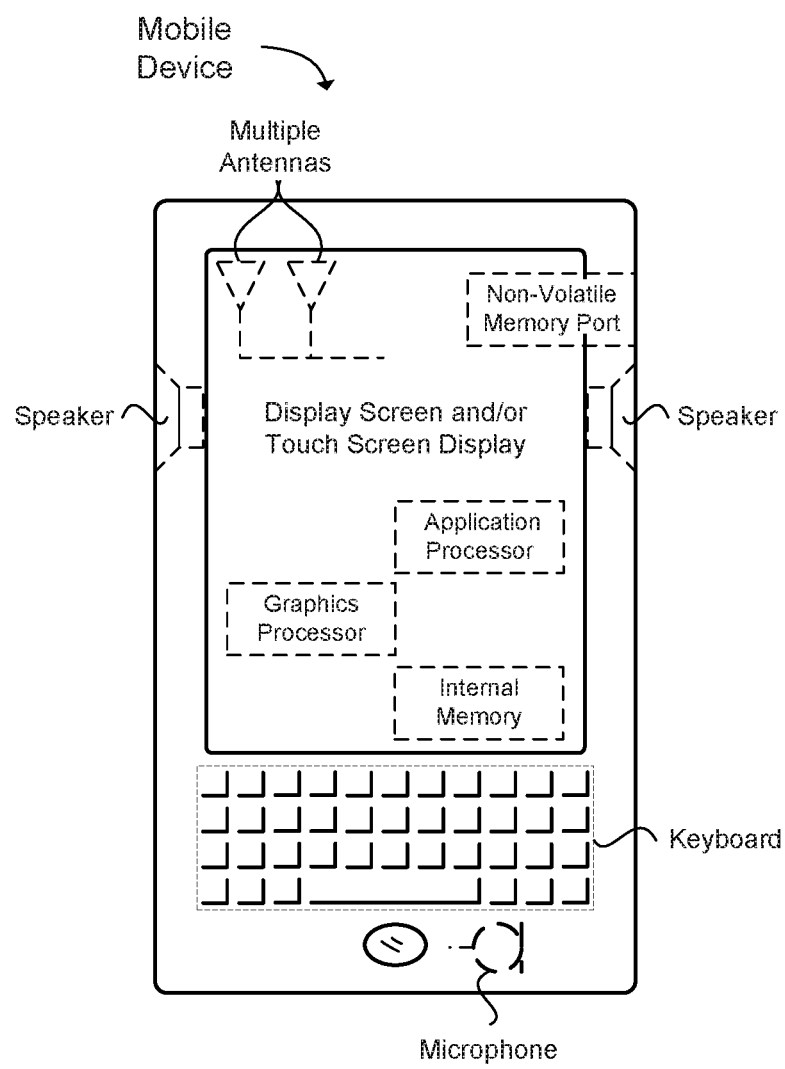
FIG. 10 illustrates a diagram of a wireless device (e.g., UE) in accordance with an example.

FIG. 10 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 10 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of a user equipment (UE) operable for wideband coverage enhancement, the apparatus comprising: one or more processors configured to: decode, at the UE, downlink control information (DCI) received in a physical downlink control channel (PDCCH); identify, at the UE, a transport block size (TBS) scaling factor from the DCI; identify, at the UE, a repetition number from the DCI, wherein the repetition number configures the UE to receive or transmit one or more of data and control channel information that is repeated, in the time domain, a selected number of times based on the repetition number; and encode, at the UE, one or more of data or control information, for transmission to a next generation node B (gNB), based on the TBS scaling factor and the repetition number; and a memory interface configured to send the DCI to a memory.

Example 2 includes the apparatus of Example 1, wherein the one or more processors are further configured to: decode, at the UE, a radio resource control (RRC) signal that includes a wideband coverage enhancement (WCE) mode to indicate when the UE is configured to operate in the WCE mode.

Example 3 includes the apparatus of Example 2, wherein the TBS scaling factor and the repetition number are located in the DCI when the UE is configured to operate in the WCE mode.

Example 4 includes the apparatus of Example 2, wherein the TBS scaling factor is used to determine a transport block size for the UE that is configured to operate in the WCE mode.

Example 5 includes the apparatus of Example 4, wherein the TBS scaling factor is 0.5 or 1.

Example 6 includes the apparatus of any of Examples 2 to 5, wherein the RRC signal includes a 1-bit flag.

Example 7 includes the apparatus of any of Examples 1 to 5, further comprising a transceiver configured to receive the DCI received in the PDCCH, wherein the DCI includes the TBS scaling factor and the repetition number.

Example 8 includes the apparatus of any of Examples 1 to 5, wherein the UE includes an antenna, a touch sensitive display screen, a speaker, a microphone, a graphics processor, an application processor, an internal memory, a non-volatile memory port, or combinations thereof.

Example 9 includes an apparatus of a next generation node B (gNB) operable for wideband coverage enhancement, the apparatus comprising: one or more processors configured to: determine, at the gNB, a transport block size (TBS) scaling factor; determine, at the gNB, a repetition number, wherein the repetition number configures the UE to receive or transmit one or more of data and control channel information that is repeated, in the time domain, a selected number of times based on the repetition number; and encode, at the gNB, the downlink control information (DCI) for transmission in a physical downlink control channel (PDCCH); encode, at the gNB, one or more of data or control information, for transmission to a user equipment (UE), based on the TBS scaling factor and the repetition number; and a memory interface configured to send the DCI to a memory.

Example 10 includes the apparatus of Example 9, wherein the one or more processors are further configured to: encode, at the gNB, a radio resource control (RRC) signal that includes a wideband coverage enhancement (WCE) mode to indicate when the UE is configured to operate in a WCE mode.

Example 11 includes the apparatus of Example 10, wherein the TBS scaling factor and the repetition number are located in the DCI when the UE is configured to operate in the WCE mode.

Example 12 includes the apparatus of Example 10, wherein the TBS scaling factor is used to determine a transport block size for the UE that is configured to operate in the WCE mode.

Example 13 includes the apparatus of Example 12, wherein the TBS scaling factor is 0.1, 0.2, 0.5, or 1.

Example 14 includes the apparatus of any of Examples 10 to 13, wherein the RRC signal includes a 1-bit flag.

Example 15 includes at least one machine readable storage medium having instructions embodied thereon for performing wideband coverage enhancement, the instructions when executed by one or more processors at a user equipment (UE) perform the following: decoding, at the UE, downlink control information (DCI) received in a physical downlink control channel (PDCCH); identifying, at the UE, a transport block size (TBS) scaling factor from the DCI; identifying, at the UE, a repetition number from the DCI, wherein the repetition number configures the UE to receive or transmit one or more of data and control channel information that is repeated, in the time domain, a selected number of times based on the repetition number; and encoding, at the UE, one or more of data or control information, for transmission to a next generation node B (gNB), based on the TBS scaling factor and the repetition number.

Example 16 includes the at least one machine readable storage medium of Example 15, further comprising instructions that when executed perform: decoding, at the UE, a radio resource control (RRC) signal that includes a wideband coverage enhancement (WCE) mode to indicate when the UE is configured to operate in a WCE mode.

Example 17 includes the at least one machine readable storage medium of Example 16, wherein the TBS scaling factor and the repetition number are located in the DCI when the UE is configured to operate in the WCE mode.

Example 18 includes the at least one machine readable storage medium of Example 16, wherein the TBS scaling factor is used to determine a transport block size for the UE that is configured to operate in the WCE mode.

Example 19 includes the at least one machine readable storage medium of Example 18, wherein the TBS scaling factor is 0.1, 0.2, 0.5, or 1.

Example 20 includes the at least one machine readable storage medium of any of Examples 16 to 19, wherein the RRC signal includes a 1-bit flag.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable for wideband coverage enhancement, the apparatus comprising:
one or more processors configured to:
decode, at the UE, downlink control information (DCI) received in a physical downlink control channel (PDCCH), the DCI comprising a transport block size (TBS) scaling factor, a repetition number, and a TBS index different from the TBS scaling factor;
identify, at the UE, a transport block size (TBS) scaling factor from the DCI;
identify, at the UE, a repetition number from the DCI, wherein the repetition number configures the UE to receive or transmit one or more of data and control channel information that is repeated, in the time domain, a selected number of times based on the repetition number; and
encode, at the UE, one or more of data or control information, for transmission to a next generation node B (gNB), based on the TBS scaling factor and the repetition number; and
a memory interface configured to send the DCI to a memory.

2. The apparatus of the UE of claim 1, wherein the one or more processors are further configured to:
decode, at the UE, a radio resource control (RRC) signal that includes a wideband coverage enhancement (WCE) mode to indicate when the UE is configured to operate in the WCE mode.

3. The apparatus of the UE of claim 1, wherein the TBS scaling factor and the repetition number are located in the DCI when the UE is configured to operate in a wideband coverage enhancement (WCE) mode.

4. The apparatus of the UE of claim 1, wherein the TBS scaling factor is used to determine a transport block size for the UE that is configured to operate in a wideband coverage enhancement (WCE) mode.

5. The apparatus of the UE of claim 1, wherein the TBS scaling factor is 0.25, 0.5, or 1.

6. The apparatus of the UE of claim 2, wherein the RRC signal includes a 1-bit flag.

7. The apparatus of the UE of claim 1, further comprising a transceiver configured to receive the DCI received in the PDCCH, wherein the DCI includes the TBS scaling factor and the repetition number.

8. The apparatus of the UE of claim 1, wherein the UE includes one or more of an antenna, a touch sensitive display screen, a speaker, a microphone, a graphics processor, an application processor, an internal memory, or a non-volatile memory port.

9. An apparatus of a next generation node B (gNB) operable for wideband coverage enhancement, the apparatus comprising:
one or more processors configured to:
determine, at the gNB, a transport block size (TBS) scaling factor;
determine, at the gNB, a repetition number, wherein the repetition number configures the UE to receive or transmit one or more of data and control channel information that is repeated, in the time domain, a selected number of times based on the repetition number; and
encode, at the gNB, the downlink control information (DCI) for transmission in a physical downlink control channel (PDCCH), the DCI to include the TBS scaling factor, the repetition number, and a TBS index;
encode, at the gNB, one or more of data or control information, for transmission to a user equipment (UE), based on the TBS scaling factor and the repetition number; and
a memory interface configured to send the DCI to a memory.

10. The apparatus of the gNB of claim 9, wherein the one or more processors are further configured to:
encode, at the gNB, a radio resource control (RRC) signal that includes a wideband coverage enhancement (WCE) mode to indicate when the UE is configured to operate in a WCE mode.

11. The apparatus of the gNB of claim 9, wherein the TBS scaling factor and the repetition number are located in the DCI when the UE is configured to operate in a wideband coverage enhancement (WCE) mode.

12. The apparatus of the gNB of claim 9, wherein the TBS scaling factor is used to determine a transport block size for the UE that is configured to operate in a wideband coverage enhancement (WCE) mode.

13. The apparatus of the gNB of claim 9, wherein the TBS scaling factor is 0.25, 0.5, or 1.

14. The apparatus of the gNB of claim 10, wherein the RRC signal includes a 1-bit flag.

15. At least one non-transitory computer readable storage medium having instructions embodied thereon for performing wideband coverage enhancement, the instructions when executed by one or more processors at a user equipment (UE) perform the following:
decoding, at the UE, downlink control information (DCI) received in a physical downlink control channel (PDCCH), the DCI comprising a transport block size (TBS) scaling factor, a repetition number, and a TBS index;
identifying, at the UE, the TBS scaling factor from the DCI;
identifying, at the UE, a repetition number from the DCI, wherein the repetition number configures the UE to receive or transmit one or more of data and control channel information that is repeated, in the time domain, a selected number of times based on the repetition number; and
encoding, at the UE, one or more of data or control information, for transmission to a next generation node B (gNB), based on the TBS scaling factor and the repetition number.

16. The at least one non-transitory computer readable storage medium of claim 15, further comprising instructions that when executed perform:
decoding, at the UE, a radio resource control (RRC) signal that includes a wideband coverage enhancement (WCE) mode to indicate when the UE is configured to operate in a WCE mode.

17. The at least one non-transitory computer readable storage medium of claim 15, wherein the TBS scaling factor and the repetition number are located in the DCI when the UE is configured to operate in a wideband coverage enhancement (WCE) mode.

18. The at least one non-transitory computer readable storage medium of claim 15, wherein the TBS scaling factor is used to determine a transport block size for the UE that is configured to operate in a wideband coverage enhancement (WCE) mode.

19. The at least one non-transitory computer readable storage medium of claim 15, wherein the TBS scaling factor is 0.25, 0.5, or 1.

20. The at least one non-transitory computer readable storage medium of claim 16, wherein the RRC signal includes a 1-bit flag.

\* \* \* \* \*